E. F. Dewey,
Can Opener.
No. 95,205.   Patented Sep. 28, 1869.
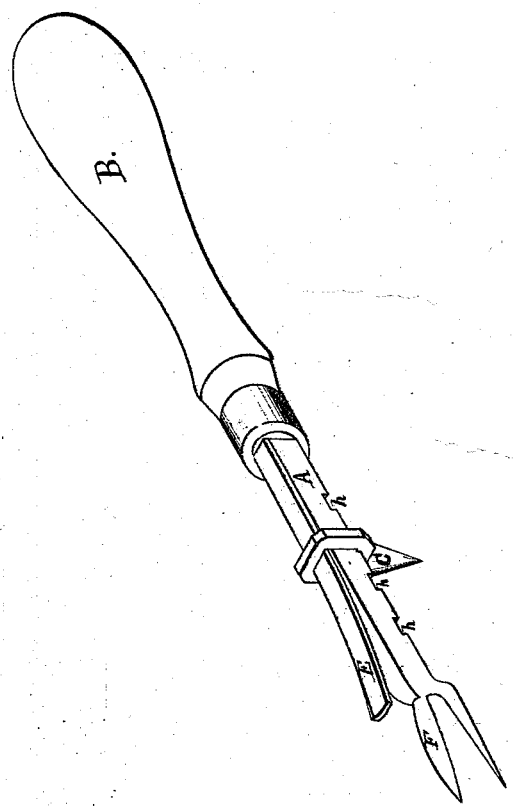
Witnesses.
Eugene Folger
Harrison Barto
Inventor.
Eugene F. Dewey,
By his Atty Dewey & Co.

United States Patent Office.

EUGENE F. DEWEY, OF SAN FRANCISCO, CALIFORNIA.

Letters Patent No. 95,205, dated September 28, 1869.

IMPROVEMENT IN CAN-OPENER.

The Schedule referred to in these Letters Patent and making part of the same.

*To all whom it may concern:*

Be it known that I, EUGENE F. DEWEY, of the city and county of San Francisco, State of California, have invented an Improved Can-Opener; and I do hereby declare the following description and accompanying drawings are sufficient to enable any person skilled in the art or science to which it most nearly appertains, to make and use my said invention or improvements, without further invention or experiment.

The object of my invention is to provide a substantial, effective, and easily adjustable can-cutter or opener of simple and cheap construction, suitable for opening fruit, oyster, and other circular cans, and, in addition thereto, and in simple combination, a supplemental knife for cutting in a straight line, as is desirable in opening sardine-boxes, lard-cans, and other like articles.

My device consists in constructing and attaching the pointed knife or cutter, so that it may be readily adjusted and firmly held upon a bar, by means of transverse slots underneath and a spring above, which holds the knife up in the slot.

The bar has an angularly-bent point for inserting in the can, and a handle on the opposite end with which to actuate the bar as a lever, carrying the knife around a circle in the operation of cutting.

Attached to the bar, and forking off from the bend near the point, is a small straight blade or knife, which, when thrust through the can under the tin, is pried upward by lowering the handle, causing it to cut forward by each downward stroke of the handle or lever, the bent portion of the bar answering the purpose of a fulcrum.

To more fully illustrate my invention, reference is had to the accompanying drawings, forming a part of this specification.

A is a bar, with a handle, B, and a bent point, similar to that ordinarily employed in can-openers, for thrusting through the top of the can.

C is a pointed knife or cutter for circular cutting, fitted loosely to the bar A. Both edges of the knife may be made sharp, so that when one edge becomes dull, the other edge may be employed, by cutting the circle in an opposite direction.

E is a flat spring, passing through the upper portion of the opening in the cutter C, over the bar A, with one end of which bar it is inserted in the handle B, and is employed to make the knife C stationary on the bar, by drawing the knife upward and holding it in either of the transverse slots $h\ h$, in the lower part of the bar, according to the diameter of the opening it is desired to cut in the can.

F is a small blade or supplemental knife, secured to the bar A so as to stand at an angle to the pointed end.

The cutter C is moved along the bar from slot to slot, so as to describe a larger or smaller cut by simply pressing the thumb on the head of the cutter, depressing the spring and lowering the cutter, so that it will slide along the bar by slight pressure on the side of the cutter.

In making a circular cut, its operation consists in stabbing the point through the centre of the top of the can and bringing the handle down so that the knife will pierce the can, when, by moving the handle round, the bar acts as a lever, causing the knife to make a circular cut, and thus quickly open the can.

For a straight cut, the small knife F is thrust through the can, when, on bringing down the handle, the bar acts as a lever and pries the knife upward, causing it to cut forward at each stroke.

The cutter C is attached to the bar before it is inserted in the handle and cannot become detached and lost.

A movable key or wedge may be used for fastening and holding the knife C, instead of the spring E, but I prefer the latter.

Thus I have cutters for circular and square cans combined in one instrument, which is very simple and cheap in construction, strong, and efficient.

It is speedily adjusted, and all its parts are so confined as not to become detached and lost.

Having thus described my invention,

What I claim, and desire to secure by Letters Patent, is—

1. Securing the knife or cutter C to the pointed bar A, by means of the slots $h\ h$ and spring E, substantially as and for the purpose herein described.

2. The angularly-pointed bar A, provided with the supplementary knife F, substantially as described.

In witness whereof, I have hereunto set my hand and seal.

EUGENE F. DEWEY. [L. S.]

Witnesses:
A. T. DEWEY,
WM. GERLACH.